(12) United States Patent
Hansen

(10) Patent No.: US 7,278,848 B2
(45) Date of Patent: Oct. 9, 2007

(54) MOLDING DEVICE

(76) Inventor: Bernd Hansen, Talstr. 22-30, 74429 Sulzbach-Laufen (DE)

( * ) Notice: Subject to any disclaimer, the term of this patent is extended or adjusted under 35 U.S.C. 154(b) by 0 days.

(21) Appl. No.: 10/548,732

(22) PCT Filed: Jan. 23, 2004

(86) PCT No.: PCT/EP2004/000531

§ 371 (c)(1),
(2), (4) Date: Sep. 13, 2005

(87) PCT Pub. No.: WO2004/091892

PCT Pub. Date: Oct. 28, 2004

(65) Prior Publication Data

US 2006/0165831 A1  Jul. 27, 2006

(30) Foreign Application Priority Data

Apr. 17, 2003  (DE) ................................ 103 17 711

(51) Int. Cl.
*B29C 49/56* (2006.01)

(52) U.S. Cl. ............................... 425/451.2; 425/451.4; 425/451.9; 425/541

(58) Field of Classification Search ................ 425/541, 425/451.2, 451.4, 451.9; *B29C 49/56*
See application file for complete search history.

(56) References Cited

U.S. PATENT DOCUMENTS

| | | | |
|---|---|---|---|
| 3,877,861 A | | 4/1975 | Kiefer et al. |
| 3,883,286 A | | 5/1975 | Kinslow, Jr. et al. |
| 4,432,720 A | * | 2/1984 | Wiatt et al. .................. 425/534 |
| 5,478,229 A | * | 12/1995 | Kato et al. ................... 425/529 |
| 5,962,039 A | * | 10/1999 | Katou et al. ................. 425/210 |
| 6,102,685 A | * | 8/2000 | Miura et al. ................. 425/193 |

FOREIGN PATENT DOCUMENTS

| | | |
|---|---|---|
| DE | 197 07 292 A1 | 8/1998 |
| DE | 197 37697 A1 | 3/1999 |
| DE | 198 11 106 A1 | 9/1999 |

\* cited by examiner

*Primary Examiner*—Robert B. Davis
(74) *Attorney, Agent, or Firm*—Roylance, Abrams, Berdo & Godman, L.L.P.

(57) ABSTRACT

A molding device includes a device for displacing at least one molding tool (10, 10a), especially for the production of geometrics of plastic containers, by a linking motion (12) which brings the respective molding tool (10, 10a) into a closing position (I-I) for at least the closure of the mold. The linking position (12) can be operated by a drive (14). Based on the linking motion (12), a novel drive and displacement concept for the respective molding tool is provided, enabling the hydraulic means to be totally dispensed with a drive, preferably an electric drive, can be used, especially in the form of a stepping motor.

19 Claims, 3 Drawing Sheets

MOLDING DEVICE

FIELD OF THE INVENTION

The present invention relates to a molding device, particularly for forming plastic containers, having a molding tool coupled to a link motion control element for moving the molding tool between opening and closing positions.

BACKGROUND OF THE INVENTION

Processes and molding devices for producing containers are known in the prior art. For example, DE 199 26 329 A1 discloses a process and molding device in which a hose of plasticized plastic material is extruded into a molding mechanism. One end of the hose is closed by heat sealing. The closed end hose is expanded by generation of a pneumatic pressure gradient acting on the hose and applied to the molding wall of the molding mechanism having two opposite molding tools to form the container. The plastic container is then filled under sterile conditions into the molding mechanism by an appropriate charging mandrel. After the charging mandrel has been removed, the filled container is hermetically sealed with a specific head geometry being formed. For the purpose of forming the plastic container proper, in which fluid is later stored, two container molding jaws may be moved toward each other by hydraulic drive means to obtain a closing position and away from each other into one of their opening positions.

The head geometries to be generated by the two separately actuatable head jaws regularly also comprise the neck component of the plastic container, including one in the form of an ampule. The container is closed by a head piece connected at a separation point that may be opened for a fluid removal process as soon as the head piece is separated by the separation point from a toggle piece molded on it, and, in this way, removed from the plastic container proper.

Such processes have been disclosed in a plurality of embodiments and are widely used in packing systems for liquid or paste products, for example, in the disclosed "bottelpack7" system.

The hydraulic drive systems regularly employed in practical applications for the respective feed movement of the molding tool present problems. Any leakage may result in fouling with the fluid, something which results in problems especially when the molding machines are used for plastic containers in the pharmaceutical and food packaging spheres and in medical technology in general. The maintenance cost is also increased. The hydraulic drive systems do not reach the desired or high cycle frequencies for mass production for precise positioning of the molding tools for shaping of containers.

SUMMARY OF THE INVENTION

An object of the present invention is to provide a molding device for moving at least one molding tool permitting application of modern drive concepts, such as ones in the form of electric or pneumatic drives. The maintenance cost of such drives is reduced. Especially high rates of output of goods can be produced, particularly plastic containers, along with high positioning accuracy for the molding tools.

The object is basically attained by a molding device according to the present invention provided with a link motion control element for moving at least one molding tool, especially one for generation of container geometries in plastic containers. This element moves the respective molding tool to a closing position at least for closing the mold, the link motion control element being actuatable by a drive. On the basis of the link motion control element, a novel drive and movement concept is presented for the respective molding tool, one which makes it possible to dispense with hydraulic drive means entirely, and by preference to employ an electric or pneumatic drive as the drive means. The link motion control element may, however, continue to be actuated conventionally by a hydraulic drive if the respective application appears to call for it and rigid requirements have not been set for sterile filling or clean room qualities.

The molding device of the present invention, with a drivable link motion control element for a closing movement of the molding tool, permits uniform, safe, and position-accurate driving of the respective molding tool and involves only a minor maintenance effort. The link motion control element may be employed to execute a plurality of opening and closing processes in rapid sequence. The molding device of the present invention results in high output of goods to be produced, in particular those in the form of blow-molded plastic containers filled under sterile conditions.

In one preferred embodiment of the molding device of the present invention, the link motion control element has a slot guide positioned on the exterior circumference of a body of rotation actuatable by a drive. Preferably, provision is also made such that an actuating member is engaged in the guide slot and operates in conjunction with a slide component. Also, during rotation of the slot guide from one of its end positions to its other end position and vice versa, the slide component with molding tool associated with it may be displaced with the molding tool by the actuating member moved longitudinally in this manner from a closing position to an opening position of the mold shaped by the respective molding tool and vice versa. Safe and precise positioning control is achieved as a result, along with clearly defined specific closing forces specified by the link motion control element.

In another especially preferred embodiment of the molding device of the present invention, the maximum closing force for the molding tool may be specified by central adjusting means on the slide component means, preferably in the form of an energy accumulator. Pressure spring elements, such as ones in the form of disk springs or the like, are suitable for use as energy accumulators. Independently of the closing force of the link motion control element which is applied, this force may be appreciably limited, and the reliability of shaping is thereby increased by the adjusting means. It has been found in configuration of the molding device to be especially cost-effective to mount the body of rotation together with the drive so as to be stationary on a machine frame in relation to which the slide component may move back and forth along its rail guide. A rigid machine configuration is achieved for the slide component and for the molding device as a whole. Obstacles in operation are reliably eliminated on the basis of the rail guide.

In another especially preferred embodiment of the molding device of the present invention, the molding tools mounted opposite each other may be moved by a single link motion control element synchronously by a common driving component. By preference, at least four link motion control elements are positioned in pairs, one opposite the other, and may be driven by gearing actuatable by the drive and the common drive component. As a result, a total of four molding tools with mold geometries mounted in sequence may be actuated in pairs operating together synchronously for shaping and mold opening processes to produce several container geometries.

In one preferred embodiment, as protection from collision, a monitoring assembly monitors the position of the link motion control element, at least with respect to the position of the molding tool in its closing position, but preferably also in its opening position.

It has also been found to be favorable for obstacle-free operation in one preferred embodiment of the molding device of the present invention for the path equation for the slot guide of the body of rotation to be executed as a Bestehorn sinoid.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

A part of the molding device as a whole for moving a molding tool 10 is described with reference to the upper left segment of the illustration in FIG. 1 and FIG. 2. On its free front side, the molding tool 10 has trough-like recesses (not shown). The recesses form mold halves for generation of container geometries for plastic containers (not shown), including ones in the form of ampules. For the purpose of generating the respective container geometries, the molding tool 10 operates in conjunction with a corresponding molding tool 10a with correspondingly shaped recesses (not shown). The two molding tools 10, 10a are in the closed molding position in FIG. 1, in which position the free front surfaces of the molding tools 10, 10a meet along a closing separation line I-I.

Figure 3:
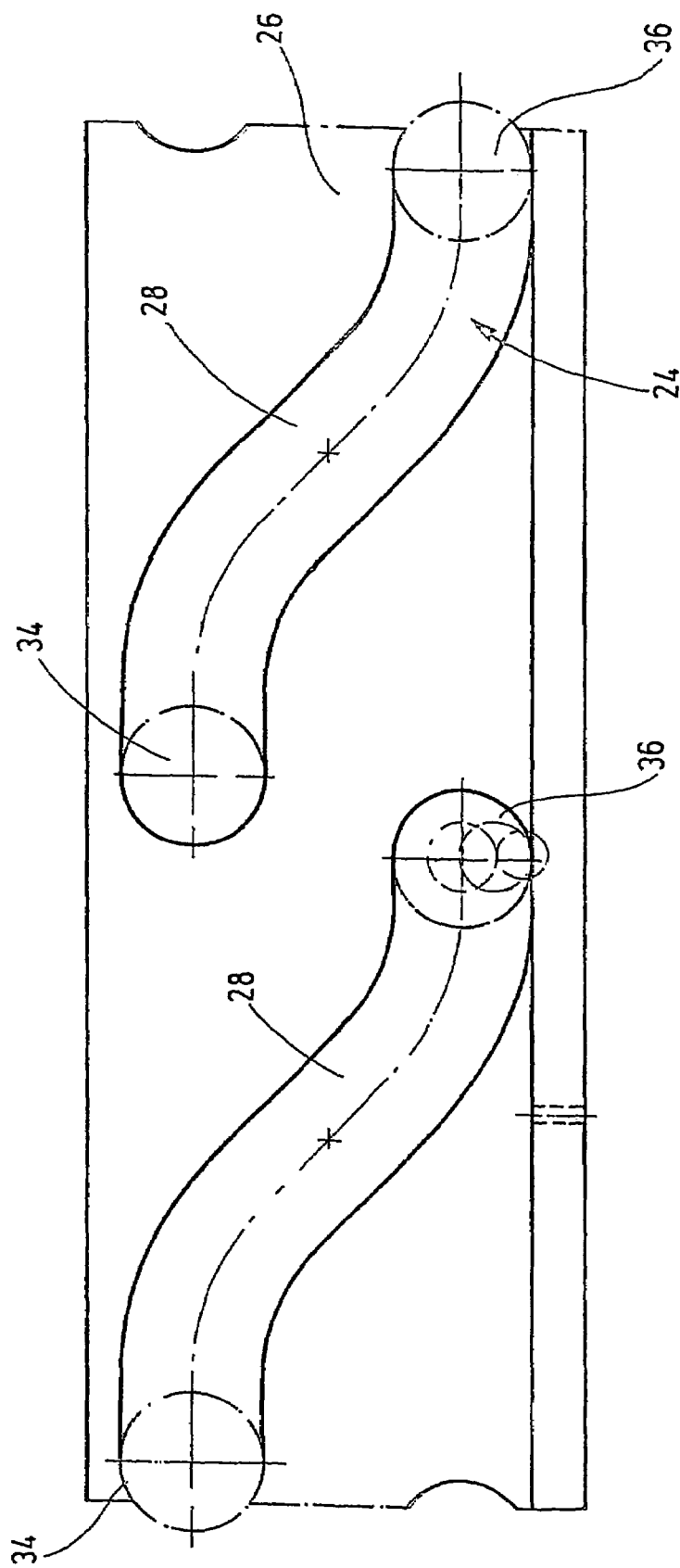
FIG. 3 is a view of the path geometry of a link motion control element mounted on a body of rotation and having slot guides, applied in the molding device shown in FIGS. 1 and 2.

For the purpose of moving the respective molding tool 10, 10a, a link motion control element 12 may be driven by a centrally mounted drive 14. For the sake of simplicity, FIG. 1 only shows the spline shaft of the drive which may be coupled to the driven shaft of an electric motor, such as one in the form of an electric stepping motor, and permits driving of the link motion control element 12. For this purpose, the spline shaft 14 is rotatably mounted by bearings 16 in a machine frame 18, and has a drive gear 20 on its one free side facing the molding tool 10. The drive gear 20 meshes with a driven gear 22 of the link motion control element 12. The link motion control element 12 has a slot guide 24 positioned on the external circumference side on a body of rotation or rotation body 26. The body of rotation may be powered by drive 14 and is essentially cylindrical in configuration. The respective slot guide 24 has two path or curve segments 28 resulting from development of the body of rotation 26 as show in FIG. 3. The respective path curve of a curve segment 28 obeys a path equation for a Bestehorn sinoid. The respective body of rotation 26 with its path curve segments 28 need not be configured to be identical for the molding tool 10a to the body of rotation 26 for the molding tool 10. In this instance, slight adaptations may be necessary with respect to the control curve pattern. However, the bodies of rotation 26 of the two mold halves 10, 10a are in other respects essentially the same.

An actuating member 30 in the form of a cam follower engages the slot guide 24 with its two path curve segments 28. The actuating member 30 is mounted rotatably on opposite sides of a slide component 32 so that, as the body of rotation 26 with its slot guide 24 rotates, uniform advance in the direction of closing of the molding tools 10, 10a is ensured, along with uniform resetting movement into a corresponding opening position, the respective rearward position being indicated by a broken-line circle at the top left in FIG. 1 and in FIG. 2. When the slot guide 24 rotates from one of its end areas 34 to the other end area 36 of a path curve segment 28, the slide component 32 may be displaced longitudinally in one direction of movement and in the other direction when the body of rotation rotates in the opposite direction. Consequently, the maximum path of travel which may be reached for the slide component 32 is determined by the longitudinal axial distance between the end areas 34, 36 opposite each other of two different path curve segments 28 of a slot guide 24 of a body of rotation 26.

The slide component 32 has on its frontal side facing the molding tool 10 a guide component 38 on which the respective molding tool 20 may be mounted so as to be replaceable. The guide component 38 is mounted on the edge side so that it may be displaced axially in the longitudinal direction along two rail guides 40. The ends of the rail guides 40 are appropriately mounted in the machine frame 18. In addition, the guide component 38 is retained so that it may be displaced longitudinally in a displacement component 42 of the slide component in a direction in parallel with the rail guides 40. The displacement component 42 rests on adjusting means 44 in the form of a disk spring package which functions as a compression spring. In this way the maximum closing force for the molding tool 10 may be determined by the adjusting means 44 so that a reliably operating shaping process is made possible.

Figure 1:
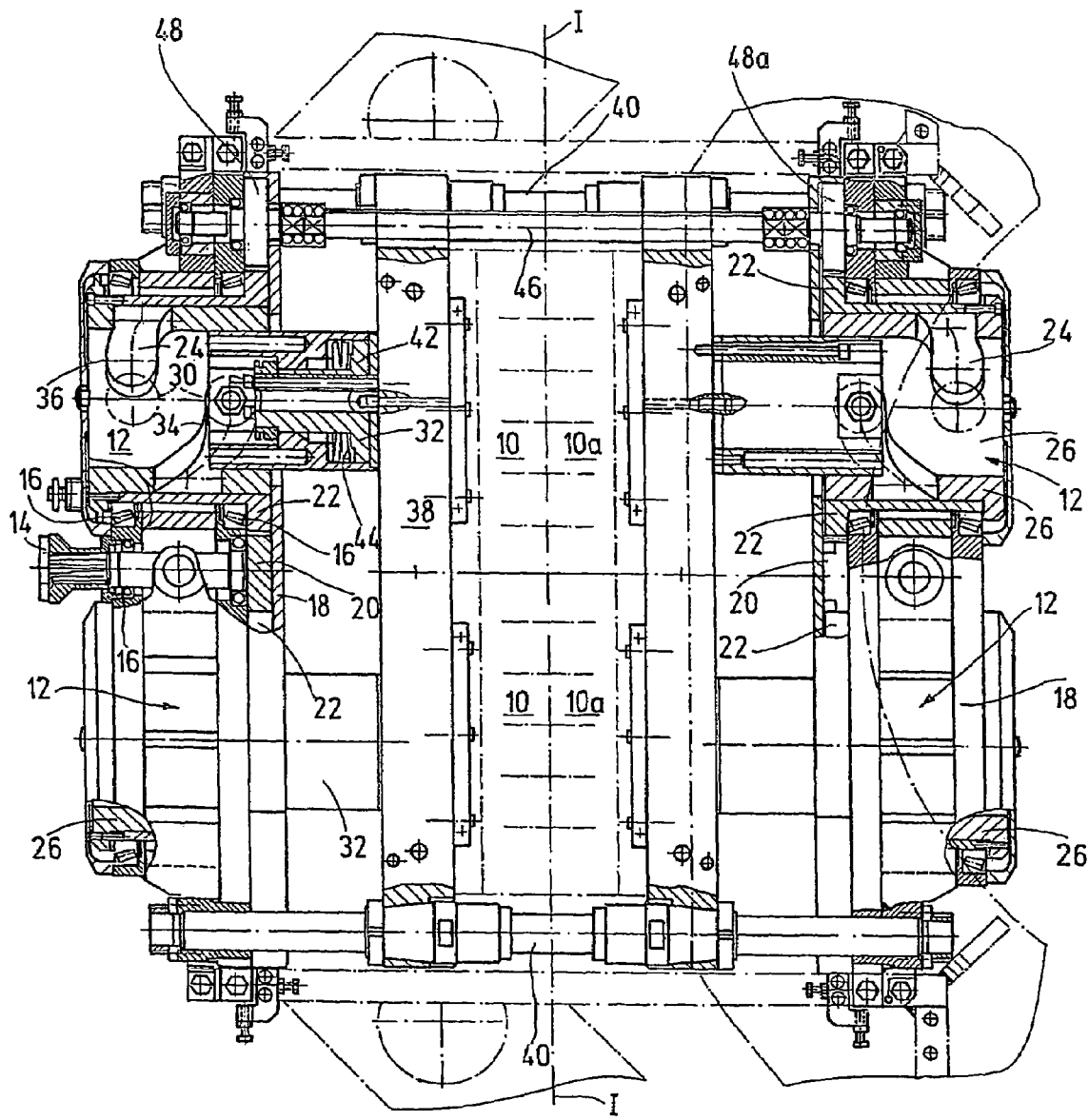
FIG. 1 is a top plan view of the molding device as a whole and partially in section, according to an embodiment of the present invention.

In FIG. 1, a drive component 46 in the form of a drive shaft is mounted at the top in parallel with the upper rail guide 40. At both ends of the drive shaft 46, a crown gear 48, 48a is connected to this shaft. As the body of rotation 26 moves by the drive shaft 14, the driven gear 22 meshes with the crown gear 48, thereby driving the drive shaft 46, which in turn transmits the driving power by the crown gear 48a on the opposite side to the following driven gear 22 of the body of rotation 26 following in the drive chain. Consequently, the molding tools 10, 10a mounted opposite each other may be actuated and moved in pairs by a single link motion control element 12 with drive 14, by the common drive component 46. Hence, molding tools 10, 10a move synchronously into their opening position and into their closing position along the closing separation line I-I.

As is also to be seen in the illustration in FIG. 1, four link motion control elements 12 positioned opposite each other in pairs may be actuated in the drive direction appropriate for back-and-forth movement of the slide components 32 of the molding device by the gears operated by the drive 14 including gears 20, 22 and 48, 48a. The respective drive is very accurate and permits precise positioning of the respective molding tool 10, 10a for a molding process. In addition, the molding tools 10 opposite each other in one line may be connected to each other on one side, but may also be separated from each other. Such positioning may also apply correspondingly to molding tools 10*a* mounted opposite each other.

Figure 2:
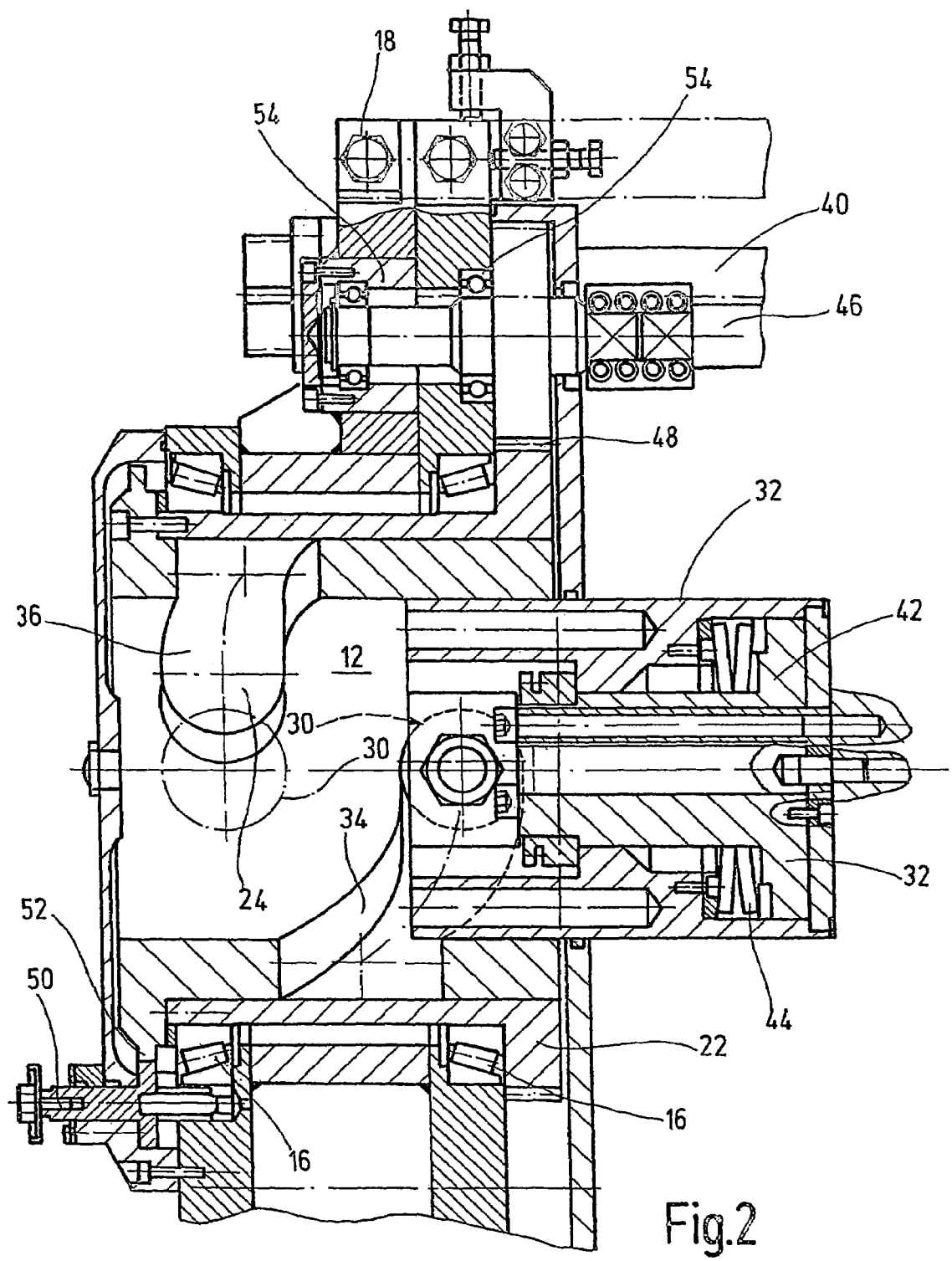
FIG. 2 is a top plan view in section of an enlarged portion of the upper left segment of FIG. 1.

As is also to be seen in FIG. 2, a monitoring assembly 50 is provided. It is spring-loaded and may be displaced longitudinally from its locking position illustrated in FIG. 2 into a release position, preferably from the exterior by an actuator, in particular one in the form of a pneumatic cylinder or the like. The body of rotation 26 accordingly has on the external circumference side a first recess 52 corresponding to the closing position of the molding tools 10, 10*a*. If locking occurs in this locking position, that is, if parts of the monitoring assembly 50 are engaged in the associated recess 52 in the body of rotation 26, it is made certain that a locking position has been assumed along the closing separation line I-I by the molding tools 10, 10*a* and that the machine control unit then recognizes that a reliable molding process is possible. If, as a result of an error, the proper closing position is not assumed, the monitoring assembly 50 ascertains this and the molding process could be halted without damage to the molding device. The reset opening position area for the molding tools 10, 10*a* may also be monitored synchronously by the monitoring assembly 50, by a recess (not shown) positioned diametrically opposite recess 52. In addition, the drive shaft 46 is mounted on the end side so as to be rotatable, by additional bearings 54 in the machine frame 18.

The configuration of the described molding device makes it possible to reach very high cycle speeds in production of molded containers of a plastic material, along with very high machining accuracy, in view of the specifiable accuracy of positioning of the molding tools 10, 10*a*, with respect both to their closing position and to movement apart into their opening position for the production mold. The molding device is very rigidly configured from the viewpoint of its structural design, so that precise actuation of the moving parts is ensured. Also, the molding device may be very cost-effectively produced and maintained because of the equivalent parts employed.

While various embodiments have been chosen to illustrate the invention, it will be understood by those skilled in the art that various changes and modifications can be made therein without departing from the scope of the invention as defined in the appended claims.

What is claimed is:

1. A molding device, comprising:
 a first molding tool;
 a link motion control element coupled to and moving said molding tool between an opening position and a closing position, said link motion control element having a rotation body with a slot guide on an external circumferential side thereof, having an actuating member engaged by said slot guide and having a slide component operable in conjunction with said actuating member, rotation of said slot guide from one end area to another end area and vice versa displacing said slide component and said molding tool by longitudinal displacement of said actuating member between said opening and closing positions of said molding tool;
 a drive coupled to and actuating said rotation body; and
 adjusting means on said slide component for varying a maximum closing force of said molding tool.

2. A molding device according to claim 1 wherein said adjusting means is an energy accumulator.

3. A molding device according to claim 1 wherein
 said rotation body is mounted stationary with said drive on a machine frame relative to said slide component; and
 said slide component is movable back and forth along a rail guide.

4. A molding device according to claim 1 wherein
 a second molding tool is mounted opposite said first molding tool and is coupled to and moved by a second link motion control element synchronously by a common drive component as a pair with said first molding tool.

5. A molding device according to claim 4 wherein
 third and fourth molding tools are mounted opposite one another and are coupled to and moved as a pair by third and fourth link motion control elements, respectively, synchronously by gearing operated by said drive and said common drive component with said first and second molding tools.

6. A molding device according to claim 1 wherein
 a monitoring assembly is coupled to said link control element to monitor positions thereof relative to positioning of said molding tool in said closing position.

7. A molding device according to claim 1 wherein
 said guide slot extends along a path defined by a Bestehorn sinoid.

8. A molding device according to claim 1 wherein
 said drive is a stepping electric motor.

9. A molding device, comprising:
 first and second molding tools mounted opposite one another as a first pair;
 third and fourth molding tools mounted opposite one another as a second pair;
 first and second link motion control elements coupled to and moving said first and second molding tools, respectively, opposite each other as said first pair synchronously between opening positions and closing positions;
 third and fourth link motion control elements coupled to and moving said third and fourth molding tools, respectively, opposite each other as said second pair synchronously between opening positions and closing positions;
 a drive and a common drive component coupled to and actuating by gearing said link motion control element.

10. A molding device according to claim 9 wherein
 each said link motion control element has a rotation body with a slot guide on an external circumferential side thereof.

11. A molding device according to claim 10 wherein
 an actuating member is engaged by each said slot guide and has a slide component operable in conjunction with each said actuating member, rotation of each said slot guide from one end area to another end area and vice versa displacing the respective slide component and the respective molding tool by longitudinal displacement of the respective actuating member between said opening and closing positions of the respective molding tool.

12. A molding device according to claim 9 wherein
 said rotation bodies are mounted stationary with said drive on a machine frame relative to said slide components; and
 each said slide component is movable back and forth along a rail guide.

13. A molding device according to claim 9 wherein
said guide slot extends along a path defined by a Bestehorn sinoid.

14. A molding device according to claim 9 wherein
said drive is a stepping electric motor.

15. A molding device, comprising:
a first molding tool;
a link motion control element coupled to and moving said molding tool between an opening position and a closing position, said link motion control element having a rotation body with a slot guide on an external circumferential side thereof, said guide slot extending along a path defined by a Bestehorn sinoid; and
a drive coupled to and actuating said rotation body.

16. A molding device according to claim 15 wherein
an actuating member is engaged by said slot guide and has a slide component operable in conjunction with said actuating member, rotation of said slot guide from one end area to another end area and vice versa displacing said slide component and said molding tool by longitudinal displacement of said actuating member between said opening and closing positions of said molding tool.

17. A molding device according to claim 15 wherein
said rotation body is mounted stationary with said drive on a machine frame relative to said slide component; and
said slide component is movable back and forth along a rail guide.

18. A molding device according to claim 15 wherein
a monitoring assembly is coupled to said link control element to monitor positions thereof relative to positioning of said molding tool in said closing position.

19. A molding device according to claim 15 wherein
said drive is a stepping electric motor.

* * * * *